(12) United States Patent
Harrington et al.

(10) Patent No.: US 10,406,436 B1
(45) Date of Patent: Sep. 10, 2019

(54) PROVIDING CONTENT BASED ON PRESENTATION CONTROL DEVICE

(71) Applicant: Electronic Arts Inc., Redwood City, CA (US)

(72) Inventors: Clifford J. Harrington, San Francisco, CA (US); Kent Wakeford, Hillsborough, CA (US)

(73) Assignee: Electronic Arts Inc., Redwood City, CA (US)

( * ) Notice: Subject to any disclaimer, the term of this patent is extended or adjusted under 35 U.S.C. 154(b) by 227 days.

(21) Appl. No.: 15/707,977

(22) Filed: Sep. 18, 2017

Related U.S. Application Data

(63) Continuation of application No. 14/037,284, filed on Sep. 25, 2013, now Pat. No. 9,764,227.

(51) Int. Cl.
*A63F 13/50* (2014.01)

(52) U.S. Cl.
CPC .................................. *A63F 13/50* (2014.09)

(58) Field of Classification Search
CPC ...................................................... A63F 13/50
USPC ......................................................... 463/36
See application file for complete search history.

(56) References Cited

U.S. PATENT DOCUMENTS

| 7,500,917 | B2 | 3/2009 | Barney |
| 8,330,284 | B2 | 12/2012 | Weston |
| 8,384,668 | B2 | 2/2013 | Barney |
| 2003/0009755 | A1 | 1/2003 | Allibhoy |
| 2010/0167648 | A1 | 7/2010 | Doutriaux |
| 2011/0107239 | A1 | 5/2011 | Adoni |
| 2011/0201432 | A1 | 8/2011 | Waldock |
| 2012/0258802 | A1 | 10/2012 | Weston |
| 2013/0109479 | A1 | 5/2013 | Ganz |

*Primary Examiner* — Omkar A Deodhar
*Assistant Examiner* — Wei Lee
(74) *Attorney, Agent, or Firm* — Knobbe, Martens, Olson & Bear, LLP

(57) ABSTRACT

An online gaming system for providing online game content to users based presentation control device. The system may comprise one or more processors configured to execute computer program modules including: a game module configured to execute an instance of an online game and to implement the instance of the online game to facilitate participation of users in the online game via presentation control devices; a user module configured to manage content sets corresponding to the individual users; a presentation control device module configured to manage game content sets corresponding to presentation control devices; a detection module configured to detect users physically present at the presentation control devices; and a content module configure to: determine appropriate content sets which are to be made available for participation by the users, and effectuate presentation of the game content to facilitate participation of the users in the determined appropriate game content sets.

20 Claims, 3 Drawing Sheets

PROVIDING CONTENT BASED ON PRESENTATION CONTROL DEVICE

FIELD OF THE DISCLOSURE

This disclosure relates to providing game content to users of an online game based on presentation control devices used to access the online game.

BACKGROUND

Virtual spaces, such as online games, can be enjoyed by users from a variety of media devices. The versatility of virtual spaces allows users to log into user accounts associated there with and participate in the virtual space from nearly any device capable of network communication. Users may log on via presentation control devices, such as television set-top boxes, smart TVs, computers, and gaming consoles. Users may access virtual spaces via mobile user devices such as mobile computing devices, smartphones, tablet computers, cellular telephones, and mobile gaming devices.

Virtual space content which is provided to the users facilitating participation by the users is typically limited. For example, content may be limited if the user participating in the virtual space is a "guest", that is, does not have a user account associated with the virtual space. Even still, users having user accounts may still be limited to "general" content which is presented to all users with user accounts. Users may additionally "unlock" or otherwise acquire more content to enhance their gameplay experience with the "general" content. However, this "unlocked" content may be limited in that it requires substantial user participation and/or user skill (in the case of an online game) to be able to achieve the "unlocks" in the first place.

SUMMARY

One aspect of the disclosure relates to an online gaming system configured to provide game content to users of an online game based on presentation control devices used to access the online game. The system may comprise one or more processors configured to execute computer program modules. The computer program modules may comprise a game module, a user module, a presentation control device module, a detection module, a content module, and/or other modules.

The game module may be configured to execute an instance of an online game, and to implement the instance of the online game to facilitate participation of users in the online game via presentation control devices.

The user module may be configured to manage user accounts associated with the users in the online game. The user accounts may indicate one or more game content sets which correspond to the individual users. Game content sets corresponding to individual users may be content made available to the users by virtue of the associated user accounts. The user accounts may include a first user account associated with a first user. The first user account may indicate a first game content set corresponding to the first user.

The presentation control device module may be configured to manage game content sets corresponding to individual presentation control devices. Game content sets corresponding to presentation control devices may be content which is made available at the individual presentation control devices for users physically present at the presentation control devices. The game content sets corresponding to presentation control devices may include a second game content set corresponding to a first presentation control device.

The detection module may be configured to detect users physically present at the presentation control devices. Detecting users may include detecting mobile devices used by the users physically present at the presentation control devices.

The content module may be configured to determine appropriate game content sets which are to be made available for participation by users. The appropriate game content may include the one or more of content sets which correspond to the individual users and/or content sets corresponding to presentation control device which the users are physically present. For example, by virtue of the detection module detecting the first user at the first presentation control device, the content module may be configured to determine that the first game content set and second game content set is to be made available for participation by the first user at the first presentation control device.

The content module may be configured to effectuate presentation of the game content sets via the game module to facilitate participation of the users in the determined appropriate game content sets. This may include, for example, effectuating presentation of the first game content set and second game content set via the game module to facilitate participation in the first game content set and second game content set by the first user accessing the online game via the first presentation control device.

Another aspect of the disclosure relates to a method for presenting online game content to user of the online game based on presentation control devices. The method may be implemented in a computer system that includes one or more physical processors and storage media storing machine-readable instructions. The method may comprise the operations of: executing an instance of an online game to implement the instance of the online game to facilitate participation of users in the online game via presentation control devices; managing user accounts associated with the users in the online game, the user accounts indicating game content sets which correspond to the individual users, wherein game content sets corresponding to individual users is content made available to the users by virtue of the associated user accounts, the user accounts including a first user account associated with a first user, the first user account indicating a first game content set corresponding to the first user; managing game content sets corresponding to individual presentation control devices, wherein game content sets corresponding to presentation control device is content made available at the individual presentation control devices for users physically present at the presentation control devices, the game content sets corresponding to presentation control devices including a second game content set corresponding to a first presentation control device; detecting users physically present at the presentation control devices; determining appropriate game content sets which are to be made available for participation by users, wherein the appropriate game content includes one or more of content sets corresponding to the individual users and content sets corresponding to presentation control device, including, by virtue of detecting the first user at the first presentation control device, determining that the first game content set and second game content set is to be made available for participation by the first user at the first presentation control device; effectuating presentation of the game content sets to facilitate participation of the users in the determined appropriate game content sets, including, effectuating presentation of the first game content set and second game content set to facilitate participation in the first game content set and second game content set by the first user accessing the online game via the first presentation control device; and/or other operations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
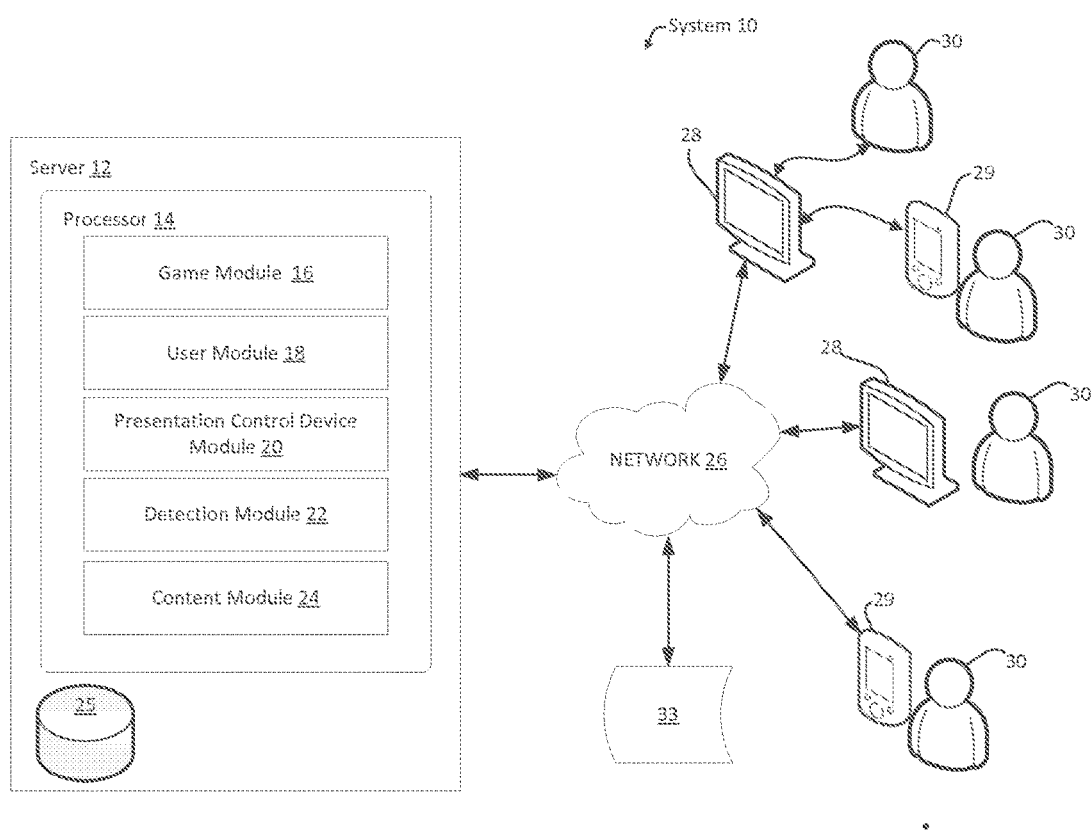
FIG. 1 illustrates a system configured to provide content to users of an online game based on presentation control devices used to access the online game.

FIG. 1 illustrates a system 10 configured to provide content to users 30 of a virtual space based at least in part on presentation control devices 28 used to access the virtual space. Providing content may comprise effectuating presentation of the content to facilitate user participation in the content. A virtual space may include, for example, an online game. Virtual space content may include online game content. Presentation control devices 28 may include, for example, a television set-top box, smart TV, computer, gaming console, and/or other device suitable for the intended purposes described herein. In some implementations, users may access the virtual space via user devices 29. User devices 29 may include mobile computing devices. User device 29 may comprise smartphones, tablet computers, cellular telephones, mobile gaming device, PC's, and/or other considerations of user devices 29. User devices 29 may be internet connectable devices. It is noted that the distinction herein between user devices 29 and presentation control devices 28 is provided merely for illustrative purposes and is not intended to be limiting. In some implementations, the scope of presentation control devices 28 may encompass the scope of user devices 29 as described herein, or vice versa.

Game content may be considered in a variety of ways. Game content may comprise sets of game content. Sets of game content may include one or more of virtual characters, virtual items, game levels, game maps, game enhancements, promotional offers, and/or other considerations for content and/or content sets. Herein game content may refer to individual game content as well as sets of game content. Game content may be content which is acquired via in-game unlocks, purchases, upgrades, achievements, and/or other considerations for acquiring game content. Game content may be content corresponding with one or more presentation control devices. Game content may be content corresponding to one or more individual users (e.g., to user accounts of the users).

Game content corresponding to presentation control devices 28 may be content which has be acquired specifically for use at the given presentation control device 28. Game content corresponding with presentation control devices 28 may be content which can only be accessed by users who are physically present at the presentation control device 28 with which the content corresponds. It is noted, however, that different presentation control devices 28 may have the same or similar game content corresponding thereto. That is, game content corresponding to a presentation control device 28 is not intended to imply that the content is exclusive to the particular presentation control device 28. For example, different users at different presentation control device may acquire the same or similar game content such that the content corresponds to each of the presentation control devices respectfully.

Presentation control devices 28 may include identification information, such as a serial number, user name, and/or other information associated therewith. Particular game content corresponding to a given presentation control device 28 may correlate with the identification information of the presentation control device 28. Game content corresponding to presentation control devices 28 may only be accessed if the user requesting access to the content is physically present at the presentation control device 28 having the appropriately corresponding identification information.

For example, a user accessing the virtual space from a given presentation control device 28 may unlock (e.g., through purchase and/or through other means) game content including one or more virtual items (and/or other game content, for example, a map upgrade) for use specifically at a given presentation control device 28. As such the purchased virtual items (and/or other content) may be only available to users who access the virtual space via the given presentation control device 28 (or one or more other presentation control devices which the content has been acquired to correspond thereto). Content corresponding with presentation control devices 28 may be stored locally at the presentation control devices 28. Content corresponding to presentation control devices 28 may be stored remotely (e.g., on a remote server) from the presentation control devices 28. Content corresponding to presentation control devices 28 may be considered in other ways.

Content corresponding to individual users may be content corresponding to one or more user accounts associated with the users. Content corresponding to individual user accounts may be content which has been acquired specifically for use by the user associated with the user account. The game content corresponding to individual users may be content which is made available to the users by virtue of access to the associated user accounts. Briefly, however described in more detail herein, a user may have a user account associated with the virtual space (e.g., an online game account). The user account may store information about the user, for example information regarding content available to the user including un-locks, achievements, upgrades, purchases, and/or other information associated specifically with the individual user accounts. For example, a given user account may include information such as one or more virtual items purchased by the user associated with the account. The virtual items may be available to the user associated with the account by virtue of access to account. The virtual item may be made available to the user any time the user accesses (e.g., logs into) their user account. The virtual item (and/or other content) may be made available to the user independent of the presentation control device 28 and/or user device 29 (e.g., a mobile device) used to access the virtual space (e.g., the content corresponds to the user account and not to the device used to access the account and/or virtual space).

Briefly, the system 10 herein may be configured to detect one or more users who are physically present at the presentation control devices 28. Game content may be provided to the individual users based on the individual user account associated with the users. Game content may be provided to the individual users based on presentation control device 28 used by the users detected to be physically present at the presentation control devices 28. The content provided may be the content corresponding to the presentation control device 28. The content provided may be content corresponding to individual user accounts. The content provided to the users physically present at the presentation control devices 28 may be other considerations of game content. The content may be provided to some or all users physically present at the presentation control devices 28.

In FIG. 1, providing the virtual space may include hosting the virtual space over a network 26, such as the Internet. A host server may include one or more processors configured to execute one or more computer modules for implementing an instance of an online game and to facilitate the participation of one or more users in the online game. The host server may be a game server 12. The server 12 may include processor(s) 14.

The computer program modules may include one or more of a game module 16, a user module 18, a presentation control device module 20, a detection module 22, a content module 24, and/or other modules. The server 12 may be configured to communicate with one or more presentation control devices 28 and/or user devices 29, according to client/server architecture. The users 30 may access the system 10 and/or the virtual space via presentation control devices 28 and/or user devices 29.

The game module 16 may be configured to implement an instance of the virtual space executed by the computer modules to determine state of the virtual space. The state may then be communicated (e.g., via streaming visual data, via object/position data, and/or other state information) from server 12 to presentation control devices 28 and/or user devices 29 for presentation to users. The state determined and transmitted to a given presentation control device 28 and/or user devices 29 may correspond to a view for a user character being controlled by a user via input devices (e.g., a controller) at the given presentation control device 28 and/or user device 29. The state determined and presented to a given presentation control device 28 may correspond to a location in the virtual space (e.g., location in the game). The view described by the state for the given presentation control device 28 and/or user device 29 may correspond, for example, to the location from which the view is taken, the location the view depicts, and/or other locations, a zoom ratio, a dimensionality of objects, a point-of-view, and/or view parameters of the view. One or more of the view parameters may be selectable by the user.

An instance of the virtual space may comprise a simulated space that is accessible by users via clients (e.g., presentation control devices 28 and/or user devices 29) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer modules may be synchronous, asynchronous, and/or semi-synchronous.

The above description of the manner in which state of the virtual space is determined by game module 16 is not intended to be limiting. The game module 16 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game module 16, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual items and/or currency that the user can use (e.g., by manipulation of a user character or other user controlled element, and/or other items) within the virtual space.

The users 30 may participate in the instance of the virtual space by controlling one or more of the available user controlled elements in the virtual space. Control may be exercised through control inputs and/or commands input by the users through presentation control devices 28 and/or user devices 29. The users 30 may interact with each other through communications exchanged within the virtual space. Such communications may include one or more of textual chat, instant messages, private messages, voice communications, and/or other communications. Communications may be received and entered by the users via their respective presentation control devices 28 and/or user devices 29. Communications may be routed to and from the appropriate users 30 through server 12 (e.g., through game module 16) and/or through communications which are external to the system 10 (e.g., text messaging services associated with the presentation control devices 28 and/or user devices 29).

The instance of the virtual space and/or the online game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the players inventory, changes in other players inventories, changes experienced by non-player characters, changes in game content corresponding to presentation control devices and/or the individual users, and/or other changes.

For example, a user may log out of their user account. While logged out, changes to the availability to sets of game content corresponding to the user may occur. Game content (e.g., virtual items, offers, etc.) which the user may have acquired prior to logging out may have an expiration (e.g., expires at log out and/or after a time period) and/or may otherwise become unavailable to the user at the next instance the user logs back in (e.g., the content no longer corresponds to that user). Conversely, during the time a user is logged out, new content (e.g., a new promotional offer) may be automatically acquired by the user (e.g., automatically acquired to correspond to the particular user and associated user account), such that at the next instance of logging in to the online game, the user may access the new content. Changes to content corresponding to individual users and/or presentation control devices may be considered in other ways.

The user module 18 may be configured to access and/or manage one or more user profiles and/or user accounts associated with users of the system 10. The one or more user profiles and/or user accounts may include information stored by server 12, one or more of the presentation control devices 28 and/or user devices 29, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information (e.g., a log-in history indicating the frequency and/or amount of times the user logs-in to the user accounts), demographic information associated with users, interaction history among users in the virtual space, information stated by users, browsing history of users, a presentation control device being used by the user, a phone number associated with a user, information about content corresponding to the user associated with the user account which is available to the user (e.g., un-locked, achieved, purchased, acquired and/or other content), and/or other information related to users.

In some implementations, the user module 18 may be configured such that the user accounts indicate the availability of game content corresponding to the individual users in the online game. Content corresponding to users may be content which is made available to the users by virtue of the user having access to the associated user accounts. Game content may be content which is unlocked, achieved, purchased, and/or otherwise acquired by the user for the user. For example, users may access (e.g., log into) their user accounts and make content purchases using virtual and/or real currency through virtual shops. The purchased (or other considerations for content acquisition) content may be made available to the user any time the user logs into their user account when accessing the virtual space (or due to the persistence of the online game, content may be made available during times the user is logged out). The game content corresponding to the individual users may be made available independent of the device (e.g., presentation control devices 28 and/or user devices 29) used by the user to access the virtual space. As another example, users may acquire game level and/or virtual item unlocks through advancement in gameplay while logged into their user account. The purchased, unlocked, and/or otherwise acquired content may be participated in by the users when the users log into their user account (e.g., independent of the presentation control device 28 and/or user device 29 used to access the virtual space). Game content corresponding to individual users may be considered in other ways.

Figure 2:
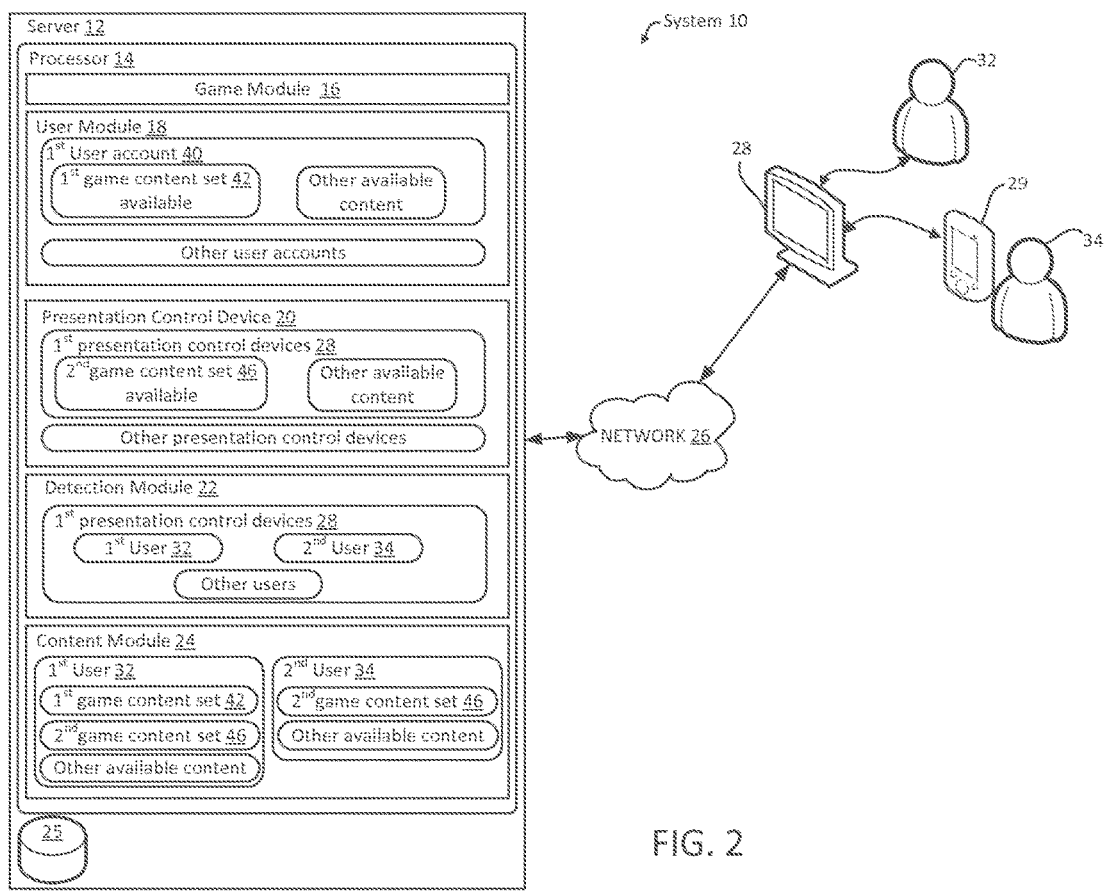
FIG. 2 illustrates a particular embodiment of the system illustrated in FIG. 1.

As an illustrative example of a particular embodiment of the system 10 in FIG. 2, the user module 18 may be configured such that the user accounts include a first user account 40 associated with a first user 32 and/or other user accounts associated with other users. The first user account 40 may indicate a first game content set 42 which is available to the first user 32. The first game content set 42 may be content corresponding to the first user 32 (e.g., user may participate in the content by virtue of the first user 32 logging into the first user account 40).

In some implementations, the user module 18 may be configured such that the first game content set 42 corresponding to the first user 32 includes content which has been unlocked by the first user 32 in association with the first user account 40 (e.g., specifically for the first user 32 when logged into the first user account 40) so that the first user 32 has access to the first content set 42 within the game. In some implementations, the first game content set 42 corresponding to the first user 32 may include content which has been purchased by the first user 32 in association with the first user account 40 so that the first user 32 has access to the first content set 42 within the game. In some implementations, the first game content set 42 may include content which has been unlocked, purchased, and/or acquired by other techniques (e.g., automatically during times the user is logged out) by the first user 32.

Returning to FIG. 1, the presentation control device module 20 may be configured to manage game content corresponding to individual presentation control devices 28. The presentation control device module 20 may manage game content corresponding to presentation control devices 28 by maintaining correlations of game content with the appropriately corresponding presentation control devices 28. Maintaining correlations with presentation control devices 28 may include maintaining correlations of the game content to the identification information (e.g., a serial number) associated with the presentation control devices 28 with which it corresponds. Managing content corresponding to presentation control devices 28 may be considered in other ways.

In some implementations, the presentation control device module 20 may be configured such that game content corresponds with an presentation control device 28 when game content is acquired specifically for use with a given presentation control devices 28. For example, a user may access the virtual space via a presentation control device 28. The user may log into their user account. The user may purchase one or more virtue items. Prior to, after, and/or during purchase of the virtual item, the user may be prompted (e.g., via pop up window, instant message, and/or other consideration) asking if they want the newly acquired content (e.g., the one or more virtual items or other content)

to correspond with their user account, and/or with the presentation control device 28 currently being used for the purchase. If a user selection is made which specifies the newly acquired content is to correspond with the presentation control device 28, the presentation control device module 20 may be configured to manage this correlation accordingly for later use when the user attempts to access the content from a presentation control device 28 (e.g., if the user is at a different presentation control device, the content may not be available to the user for participation).

In some implementations, the online game may include game content which is restricted as being one of content corresponding to presentation control devices 28 or individual users 30. The online game may comprise content which, when acquired by the user, doesn't allow user to specify whether the content is to correspond with their user account or a particular presentation control device 28. For example, one or more particular sets of game content (e.g., map upgrades, virtual items, etc.) which, when acquired can only be acquired as content corresponding to the presentation control device 28 (e.g., or the individual user).

As an illustrative example of a particular embodiment of the system 10 in FIG. 2, the presentation control device module 20 may be configured such that game content corresponding to presentation control devices includes a second game content set 46 corresponding to a first presentation control device 28. The second game content set 46 may be content which is made available for participation at the first presentation control device 28 for users who are physically present at the first presentation control device 28.

In some implementations, the presentation control device module 20 may be configured such that the second game content set 46 corresponding to first presentation control devices 28 includes content which has been unlocked during gameplay of the online game by users (e.g., the first user 32) specifically for access via the first presentation control device 28 (e.g., acquired and specified as content to correspond to the first presentation control device 28). In some implementations, the presentation control device module 20 may be configured such that the second game content set 46 includes content which has been purchased by users (e.g., the first user 32) at the first presentation control device 28 specifically for access via the first presentation control device 28 (e.g., acquired as content to correspond to the first presentation control device 28). In some implementations, the second game content set 46 may include content which has been unlocked, purchased, and/or acquired by other techniques specifically for the first presentation control device 28.

Returning to FIG. 1, the detection module 22 may be configured to detect users physically present at the presentation control devices 28. Detection of users may be accomplished in a variety of ways. Detection of users physically present at presentation control devices 28 may comprise detecting user devices 29 used by the users physically present at the presentation control devices 28, by virtue of user input selection indicating presence at the presentation control devices 28, and/or other considerations.

Detecting user devices 29 of users physically present at presentation control devices 28 may comprise employing wifi, near field communication, and/or other communication capabilities of one or both of the presentation control devices 28 and user devices 29. Presentation control devices 28 (e.g., detection module 22) may perform automatic network searches for detecting the presence of user devices 29 within the capable communication ranges of the presentation control devices 28. Presentation control devices 28 may automatically detect user devices 29 responsive to the user devices 29 sending communication signals (e.g., radio frequency signals) to communicate their presence within the vacuity of the presentation control devices 28. A detection of user devices 29 may comprise detecting that the user of the user device 29 is logged into their respective user account at the user devices 29 such that the server can identify a user name and/or other information about the user (e.g., information associated with the user account of the user). A detection of user devices 29 may comprise detecting other information about the user from the user devices 29.

Automatic network searches performed by the presentation control devices 28 may be performed at a frequency or rate which is predetermined by the presentation control devices 28, set by the user, and/or continuous (e.g., always searching). For example, a predetermined frequency of which the presentation control devices 28 perform searches to detect user devices 29 may be set to every 10 minutes (or other frequency). A user may set the frequency and/or other parameters (e.g., a time period) to set rules for when the presentation control devices 28 search for user devices 29 within the vicinity of the presentation control devices 28. For example, a user may make selections at the presentation control devices 28 (e.g., within an application program in the presentation control devices 28) wherein the presentation control devices 28 perform user devices 29 detection searches every 30 minutes, continuously after a given time period (e.g., when users are expected to be within the vicinity of the presentation control devices 28), and/or other frequency or parameter selection.

Users within the vicinity of presentation control devices 28 may send communication signals (e.g., radio frequency signals via NFC, Bluetooth, and/or wifi) to communicate their presence when within the vicinity of the presentation control devices 28. For example, a user may make a selection on their user devices 29 to ping the presentation control devices 28 to communicate their presence at the presentation control devices 28 and/or initiate a network search by the presentation control device 28.

Detection of users may be accomplished by user input and/or selection at the presentation control devices 28. For example, users may make selections at the presentation control device 28 (e.g., via an application program provided by the presentation control devices 28) to indicate their presence (e.g., without searching for user devices 29). User(s) may input their user name(s) and/or other information associated the user(s) who is present at a given presentation control device 28. User detection may include the act of the one or more users present at the presentation control device 28 signing into their user account via the presentation control device 28. In some implementations, content may be provided to users even if they do not have a user account, for example the users can be detected as "guests". Detection of users and/or user devices 29 physically present at presentation control devices 28 may be accomplished by other techniques.

As an illustrative example in FIG. 2, the detection module 22 may be configured such that detecting users at presentation control devices includes detecting the first user 32 and a second user 34 at the first presentation control device 28. In some implementations, the first user 32 may be detected by virtue of the first user 32 accessing (e.g., logging into) their first user account 40 via the first presentation control device 28. In some implementations, the second user 34 may be detected by virtue of a first user device 29 used by the second user 34 being detected within the vicinity of the first presentation control device 28. In some implementations, the second user 34 may be a "guest", meaning that the second user 34 may or may not have a user account associated with the virtual space.

Returning to FIG. 1, the content module 24 may be configured to determine the appropriate game content which is to be made available to the users for participation by the users. Appropriate game content may include one or more content sets which correspond to the individual users (e.g., their user accounts) and/or content corresponding to the presentation control device 28 where the user is present. For example by virtue of a user logging into their user account, and/or by virtue of the user being detected (e.g., by detection module 22) at a given presentation control device, the content module 24 may be determine that content corresponding to the user (e.g., the user's user account) and content corresponding to the presentation control device which the user is present at, is content which is to be made available for participation by the user.

The content module 24 may be configured to, by virtue of the appropriate content being determined for the individual users, effectuate presentation (e.g., via the game module 16) of the determined game content to the users to facilitate participation of the users in the determined appropriate game content.

As an illustrative example in FIG. 2, by virtue of the detection module 22 detecting the first user 32 at the first presentation control device 28 (e.g., the first user 32 logging into the first user account 40), the content module 24 may be configured to determine that the first game content set 42 (e.g., because the user is logged into their account) and second game content set 46 (e.g., because the user is physically present at the first presentation control device 28) may be made available for participation by the first user 32 at the first presentation control device 28. The content module 24 may be configured to, effectuate presentation via the game module 16 of the first game content set 42 and second game content set 46 to the first user 32 to facilitate participation in the first game content set 42 and second game content set 46 by the first user 32 accessing the online game via the first presentation control device 28.

In some implementations, the content module 24 may be configured to, by virtue of the detection module 22 detecting the second user 34 at the first presentation control device 28 (e.g., via physical presence of the first user device 29), determine that the second game content set 46 corresponding to the first presentation control device 28 is to be made available for participation by the second user 34, and effectuate via the game module 16 presentation of the second content set 46 to facilitate participation in the second game content set 46 by the second user 34 (and first user 32) via the first presentation control device 28.

In some implementations, the content module 24 may be configured to determine that the first game content set 42 is not to be made available for participation by the second user 34 since the first game content set 42 corresponds with the first user 32 and not the second user 34 (e.g., the first user account 40 associated with the first user 32, not the second user 34). Thereafter, the content module 24 may be configured to effectuate presentation via the game module 16 of the first game content set 42 to facilitate participation in the first game content set 42 by the first user 32 and not the second user 34 (e.g., a pop up windowing may be presented saying the particular content is only available for the first user 32). In some implementations, if the second user 34 logs into their user account via the first presentation control device 28, content sets corresponding to the second user account (not shown) may be made available for participation by the second user 34 and not the first user 32 at the first presentation control device 28.

Returning to FIG. 1, the server 12, presentation control devices 28, user devices 29, and/or external resources 33 may be operatively linked via one or more electronic communication links. For example, such electronic communication links may be established, at least in part, via a network 26 such as the Internet and/or other networks. It will be appreciated that this is not intended to be limiting, and that the scope of this disclosure includes implementations in which servers 12, presentation control devices 28, user devices 29, and/or external resources 33 may be operatively linked via some other communication media.

The external resources 33 may include sources of information, hosts and/or providers of virtual spaces outside of system 10, external entities participating with system 10, external entities for player-to-player communications, and/or other resources. In some implementations, some or all of the functionality attributed herein to external resources 33 may be provided by resources included in system 10.

The server 12 may include electronic storage 25, one or more processors 14, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 25 may comprise electronic storage media that electronically stores information. The electronic storage media of electronic storage 25 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 25 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 25 may include one or more virtual storage resources (e.g., cloud storage, a virtual private network, and/or other virtual storage resources). Electronic storage 25 may store software algorithms, information determined by processor 14, information received from server 12, information received from presentation control devices 28, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include one or more processing units. These processing units may be physically located within the same device, or processor 14 may represent processing functionality of a plurality of devices operating in coordination. The processor 14 may be configured to execute modules 16, 18, 20, 22, 24. Processor 14 may be configured to execute modules 16, 18, 20, 22, 24 by software; hardware; firmware; some combination of software, hardware, and/or firmware; and/or other mechanisms for configuring processing capabilities on processor 14.

It should be appreciated that although modules 16, 18, 20, 22, 24 are illustrated in FIG. 1 as being co-located within a single processing unit, in implementations in which processor 14 includes multiple processing units, one or more of modules 16, 18, 20, 22, 24 may be located remotely from the other modules. The description of the functionality provided by the different modules 16, 18, 20, 22, 24 described above is for illustrative purposes, and is not intended to be limiting, as any of modules 16, 18, 20, 22, 24 may provide more or less functionality than is described. For example, one or more of modules 16, 18, 20, 22, 24 may be eliminated, and some or all of its functionality may be provided by other ones of modules 16, 18, 20, 22, and/or 24, and/or other modules. As another example, processor 14 may be configured to execute one or more additional modules that may perform some or all of the functionality attributed below to one of modules 16, 18, 20, 22, 24.

Figure 3:
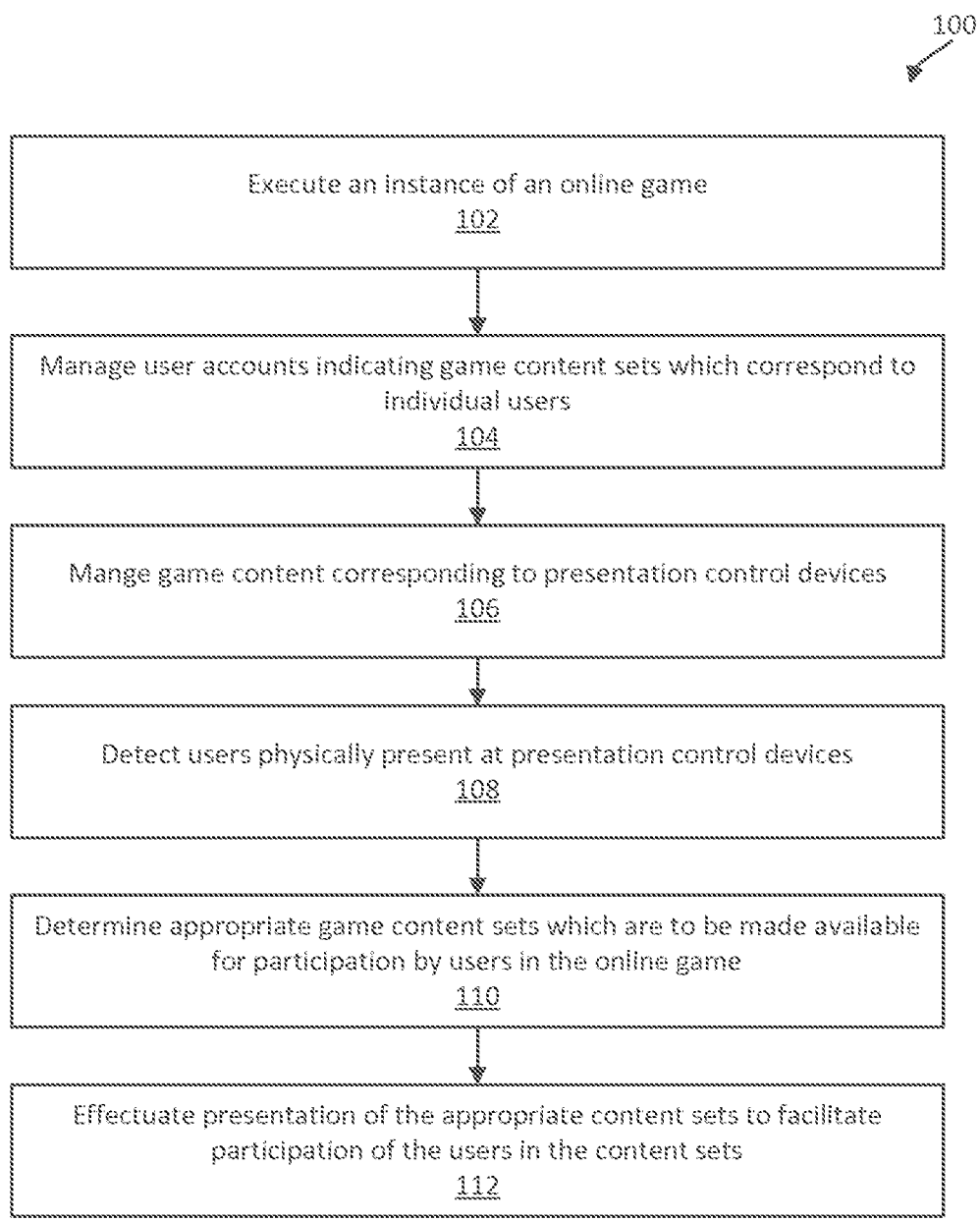
FIG. 3 illustrates a method for providing content to users of an online game.

FIG. 3 illustrates method 100 for providing content to users in an online game. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 3 and described below are not intended to be limiting.

In some embodiments, method 100 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

Referring now to method 100 in FIG. 3, at an operation 102 an instance of an online game may be executed for presentation to users at presentation control devices and/or user devices. The online game may facilitate participation of the users in the online game. In some implementations, operation 102 may be performed by a game module the same as or similar to game module 16 (shown in FIG. 1 and described herein).

At an operation 104, user accounts may be managed. The user account may include information which indicates game content sets which correspond to the individual users. Game content sets corresponding to individual users may be content which is made available to the user by virtue of the associated user accounts being accessed. In some implementations, operation 104 may be performed by a user module the same as or similar to the user module 18 (shown in FIG. 1 and described herein).

At an operation 106, game content sets corresponding to presentation control devices may be managed. Game content sets corresponding to presentation control device may be content which is made available at the individual presentation control devices for users physically present at the presentation control devices. In some implementations, operation 106 may be performed by a presentation control device module the same as or similar to the presentation control device module 20 (shown in FIG. 1 and described herein).

At an operation 108, users physically present at presentation control devices may be detected. In some implementations, operation 108 may be performed by a detection module the same as or similar to the detection module 22 (shown in FIG. 1 and described herein).

At an operation 110, appropriate content sets to be made available for participation by the users may be determined. In some implementations, operation 110 may be performed by a content module the same or similar to the content module 24 (shown in FIG. 1 and described herein).

At an operation 113, the appropriate game content may be presented to the users to facilitate participation in the content sets by the users. In some implementations, operation 110 may be performed by a content module the same or similar to the content module 24 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An online gaming system providing game content to users of an online game based on presentation control devices, the system comprising;
 one or more processors configured by machine-readable instructions to:
  execute an instance of an online game, and to implement the instance of the online game by determining state information and transmitting the state information over a network to presentation control devices to facilitate participation of the users in the online game via the presentation control devices;
  manage game content sets corresponding to individual ones of the presentation control devices, wherein the game content sets corresponding to the individual ones of the presentation control devices are content made available at the individual ones of the presentation control devices for one or more users physically present at the individual ones of the presentation control devices, the game content sets corresponding to the individual ones of the presentation control devices including a second game content set corresponding to a first presentation control device, wherein the second game content set corresponding to the first presentation control device is made available to the first user and/or other users when accessing the online game via the first presentation control device, but not when accessing the online game via a second presentation control device, and wherein a third game content set different from the second game content set and corresponding to the second presentation control device is not accessible by the first user when accessing the online game via the first presentation control device;

detect users physically present at the presentation control devices; and determine appropriate game content sets which are to be made available for participation by users, wherein the appropriate game content sets include one or more of the game content sets corresponding to the individual ones of the presentation control devices, including determining, by virtue of the detection module detecting the first user at the first presentation control device, that the second game content set is to be made available for participation by the first user at the first presentation control device based on the first user accessing the online game via the first presentation control device, and effectuate presentation of the appropriate game content sets determined to facilitate participation of the users in the appropriate game content sets determined, including, effectuating presentation of the second game content set to facilitate participation in the second game content set by the first user accessing the online game via the first presentation control device.

2. The system of claim 1 wherein the game content sets include a first game content set corresponding to the first user, and wherein the one or more processors are further configured by machine-readable instructions such that the first game content set corresponding to the first user includes content which has been unlocked by the first user in association with the first user account so that the first user has access to the first content set within the game.

3. The system of claim 1 wherein the game content sets include a first game content set corresponding to the first user, and wherein the one or more processors are further configured by machine-readable instructions such that the first game content set corresponding to the first user includes content which has been purchased by the first user in association with the first user account so that the first user has access to the first content set within the game.

4. The system of claim 1 wherein the one or more processors are further configured by machine-readable instructions such that the second game content set corresponding to first presentation control devices includes content which has been unlocked during gameplay of the online game by users for the first presentation control device.

5. The system of claim 1 wherein the one or more processors are further configured by machine-readable instructions such that the second game content set corresponding to the first presentation control device includes content which has been purchased for the first presentation control device.

6. The system of claim 1 wherein the one or more processors are further configured by machine-readable instructions such that game content sets includes one or more of gameplay modes, virtual items, virtual characters, game levels, or game maps.

7. The system of claim 1 wherein the one or more processors are further configured by machine-readable instructions such that detecting users physically present at the presentation control devices includes detecting mobile devices used by the users which are physically present at the presentation control devices.

8. The system of claim 7 wherein the one or more processors are further configured by machine-readable instructions such that detecting mobile devices comprises using wifi and/or near field communication capabilities of the presentation control devices.

9. The system of claim 1 wherein the one or more processors are further configured by machine-readable instructions such that, by virtue a second user being detected at the first presentation control device, determine that the second game content set is to be made available for participation by the second user via the first presentation control device, and effectuate presentation of the second game content set to facilitate participation in the second game content set by the first user and the second user via the first presentation control device.

10. The system of claim 9 wherein the game content sets include a first game content set corresponding to the first user, and wherein the one or more processors are further configured by machine-readable instructions to:

determine that the first game content set is not to be made available for participation by the second user, and effectuate presentation of the first content set to facilitate participation in the first game content set by the first user and not the second user.

11. A method for presenting online game content to users of the online game based on presentation control devices, the method being implemented in a computer system that includes one or more physical processors and storage media storing machine-readable instructions, the method comprising:

executing an instance of an online game to implement the instance of the online game by determining state information and transmitting the state information over a network to presentation control devices to facilitate participation of the users in the online game via the presentation control devices;

managing game content sets corresponding to individual presentation control devices, wherein game content sets corresponding to the individual ones of the presentation control devices are content made available at the individual ones of the presentation control devices for one or more users physically present at the individual ones of the presentation control devices, the game content sets corresponding to the individual ones of the presentation control devices including a second game content set corresponding to a first presentation control device, wherein the second game content set corresponding to the first presentation control device is made available to the first user and/or other users when accessing the online game via the first presentation control device, but not when accessing the online game via a second presentation control device, and wherein a third dame content set different from the second game content set and corresponding to the second presentation control device is not accessible by the first user when accessing the online game via the first presentation control device;

detecting users physically present at the presentation control devices;

determining appropriate game content sets which are to be made available for participation by users, wherein the appropriate game content sets include one or more of the game content sets corresponding to the individual ones of the presentation control devices, including, by virtue of detecting the first user at the first presentation control device, determining that the second game content set is to be made available for participation by the first user at the first presentation control device; and effectuating presentation of the game content sets to facilitate participation of the users in the determined appropriate game content sets, including, effectuating presentation of second game content set to facilitate participation in the second game content set by the first user accessing the online game via the first presentation control device.

12. The method of claim 11 wherein the game content sets include a first game content set corresponding to the first user, and wherein the first game content set corresponding to the first user includes content which has been unlocked by the first user in association with the first user account so that the first user has access to the first content set within the game.

13. The method of claim 11 wherein the game content sets include a first game content set corresponding to the first user, and wherein the first game content set corresponding to the first user includes content which has been purchased by the first user in association with the first user account so that the first user has access to the first content set within the game.

14. The method of claim 11 wherein the second game content set corresponding to first presentation control devices includes content which has been unlocked during gameplay of the online game by users for the first presentation control device.

15. The method of claim 11 wherein the second game content set corresponding to the first presentation control device includes content which has been purchased for the first presentation control device.

16. The method of claim 11 wherein game content sets includes one or more of gameplay modes, virtual items, virtual characters, game levels, or game maps.

17. The method of claim 11 wherein detecting users physically present at the presentation control devices includes detecting mobile devices used by the users which are physically present at the presentation control devices.

18. The method of claim 17 wherein detecting mobile devices comprises using wifi and/or near field communication capabilities of the presentation control devices.

19. The method of claim 11 additionally including:

by virtue detecting a second user at the first presentation control device, determining that the second game content set is to be made available for participation by the second user via the first presentation control device; and effectuating presentation of the second game content set to facilitate participation in the second game content set by the first user and the second user via the first presentation control device.

20. The method of claim 19, wherein the game content sets include a first game content set corresponding to the first user, the method additionally including:

determining that the first game content set is not to be made available for participation by the second user, and effectuating presentation of the first content set to facilitate participation in the first game content set by the first user and not the second user.

* * * * *

UNITED STATES PATENT AND TRADEMARK OFFICE
CERTIFICATE OF CORRECTION

PATENT NO. : 10,406,436 B1
APPLICATION NO. : 15/707977
DATED : September 10, 2019
INVENTOR(S) : Clifford J. Harrington It is certified that error appears in the above-identified patent and that said Letters Patent is hereby corrected as shown below:

In the Drawings

Sheet 3 of 3, FIG. 3, reference numeral 106, Line 1, delete "Mange" and insert --Manage--, therefor.

In the Specification

Column 8, Line 63, delete "virtue items." and insert --virtual items.--, therefor.

In the Claims

Column 16, Line 3, Claim 9, delete "by virtue" and insert --by virtue of--, therefor.

Column 16, Line 48, Claim 11, delete "dame" and insert --game--, therefor.

Column 18, Line 10, Claim 19, delete "by virtue" and insert --by virtue of--, therefor.

Signed and Sealed this
Twenty-fourth Day of December, 2019

Andrei Iancu
*Director of the United States Patent and Trademark Office*